UNITED STATES PATENT OFFICE.

WILLIAM H. HORNER, OF NEW YORK, AND FRANCIS HYDE, OF BROOKLYN, N. Y., ASSIGNORS TO THE UNITED STATES WATERPROOFING FIBRE COMPANY, OF NEW YORK, N. Y.

COMPOSITION FOR TREATING CORDAGE.

SPECIFICATION forming part of Letters Patent No. 336,718, dated February 23, 1886.

Application filed July 2, 1885. Serial No. 170,526. (No specimens.)

*To all whom it may concern:*

Be it known that we, WILLIAM H. HORNER, residing in New York city, and county of New York, and FRANCIS HYDE, residing in Brooklyn, in the county of Kings and State of New York, citizens of the United States, have invented certain new and useful Improvements in Compositions for Treating Cordage; and we do hereby declare the following to be a full, clear, and exact description of the invention, such as will enable others skilled in the art to which it appertains to make and use the same.

Our invention relates to an improved waterproofing composition, which is especially adapted for treating cordage, so as to preserve the same and impart to it certain qualities, as will be hereinafter fully set forth and claimed.

Our invention also consists of a composition consisting, essentially, of resin, benzine, and refined paraffine-wax, which ingredients are incorporated with each other so that the composition can be applied to cordage or fabrics without being heated.

Our composition consists, essentially, of the following ingredients in the proportions stated, though said proportions may be varied: The ordinary resin of commerce and refined paraffine-wax, one hundred pounds each, are thoroughly mixed or incorporated with each other by being heated, and when liquefied by heat they are thoroughly stirred. After this mixture becomes cool it is thinned by the addition of about fifty pounds of benzine, and these three ingredients are thoroughly assimilated with each other. The resin and the refined paraffine-wax will hold or retain the benzine, so as to prevent the rapid evaporation of this thinning ingredient. The composition produced by this mixture is of light amber color, and may be applied to the hemp fibers used in the manufacture of rope without perceptibly changing its color, so that rope when manufactured from fibers thus treated will present to the eye its usual color.

In manufacturing rope or heavy cordage the yarn may be treated before it is woven, or manufactured rope may be treated by submerging the same in a tank containing the composition. The rope after being manufactured may be dried out, so as to drive off or evaporate the surplus of the benzine and leave the other ingredients—to wit, the resin and the refined paraffine-wax—incorporated in and upon the fibers. Rope when thus treated will last much longer than the ordinary rope of commerce, and, besides being water-proof and mildew-proof, will keep for a longer time bright, and when so treated the rope will not freeze and become stiff when used in exposed places.

For treating fish nets and seines we may add to the hereinbefore-described composition of matter what is known commercially as "residuum," which is a product of mineral oil, and is the residue or distillant of the mineral oil after the benzine or naphtha and all the oil have been removed by distillation. This element will add to the composition a dark tint, which practice has shown to be very desirable, and, if so desired, suitable coloring-matter may also be incorporated with the composition, one of the most desirable colors having been found to be lamp-black.

The composition has proved to be one of the best, simplest, cleanest, and most satisfactory for the treatment of linen, cotton, or hemp nets, and will preserve the cords and fibers from decay which water and dampness occasions, and nets when treated with the composition will not stick together or smell unpleasantly, and the composition may be so colored as to impart to the net a dark water-color.

The composition after being manufactured is usually sold direct to the consumer in barrels, and one gallon of the composition will weigh about seven pounds, which is sufficient to treat, on an average, fourteen pounds of net, whether the cords be light or heavy.

Ropes and nets treated with the composition have been tested alongside of the ordinary ropes and nets, and have been found, after receiving the same amount of usage, to last from two to four times, and even longer, than the untreated article.

The composition hereinbefore described is of such a nature that it will penetrate every fiber and thread of the material to which it is applied, its action upon cordage and fabrics being to preserve the same and prevent rapid decay.

Fabrics treated with our improved composition will not heat, mold, or mildew, or cause the parts to stick together or emit an unpleasant order, and the same will render and keep the fibers soft and pliable.

In the patent dated February 27, 1883, and numbered 273,233, we employed paraffine or other mineral oils and resin, which were assimilated or mixed with each other; but we have ascertained that in treating fish-nets and cordage the present composition is far superior in some respects to the method described in said prior patent, as the articles when treated will not stick to each other or give out an unpleasant order, and will adhere more firmly on the netting, and does not render the same slippery.

We claim—

1. The improved cold and self-setting waterproofing and preserving composition for cordage, consisting of resin and paraffine-wax assimilated or mixed with each other and reduced to a proper consistency by a volatile liquid, for the purpose set forth.

2. A cold and self-setting composition for treating cordage, fish-nets, or fabrics, having as a base resin and paraffine-wax, which are assimilated or mixed with each other, residuum or distillant, and benzine for thinning the same, substantially as and in the proportion specified.

3. The improved cold and self-setting composition for treating cordage, fish-nets, and fabrics, consisting of resin, paraffine-wax, and a thinning liquid, to which is added a residuum or distillant and a coloring material, substantially as set forth.

In testimony whereof we affix our signatures in presence of two witnesses.

WM. H. HORNER. [L. S.]
FRANCIS HYDE. [L. S.]

Witnesses:
WM. F. MILLER,
JOHN R. GOBLE.